US 9,999,973 B2

(12) United States Patent
Finkemeyer

(10) Patent No.: US 9,999,973 B2
(45) Date of Patent: Jun. 19, 2018

(54) METHOD AND DEVICE FOR CONTROLLING MANIPULATORS

(75) Inventor: Bernd Finkemeyer, Augsburg (DE)

(73) Assignee: KUKA Deutschland GmbH, Augsburg (DE)

(*) Notice: Subject to any disclaimer, the term of this patent is extended or adjusted under 35 U.S.C. 154(b) by 607 days.

(21) Appl. No.: 12/950,277

(22) Filed: Nov. 19, 2010

(65) Prior Publication Data
US 2011/0125321 A1 May 26, 2011

(30) Foreign Application Priority Data
Nov. 23, 2009 (GB) .................. 10 2009 054 230

(51) Int. Cl.
G06F 19/00 (2018.01)
B25J 9/16 (2006.01)
G05B 19/045 (2006.01)

(52) U.S. Cl.
CPC .......... B25J 9/1602 (2013.01); G05B 19/045 (2013.01); G05B 2219/23287 (2013.01); G05B 2219/23289 (2013.01)

(58) Field of Classification Search
CPC ....... G06F 17/00; B25J 9/1602; B25J 9/1628; B25J 9/1656; G05B 19/045; G05B 19/414; G05B 2219/23287; G05B 2219/23289
USPC ........................................................ 700/245
See application file for complete search history.

(56) References Cited

U.S. PATENT DOCUMENTS

| 5,495,409 A * | 2/1996 | Kanno | G05B 19/042 700/79 |
| 5,929,585 A * | 7/1999 | Fujita | 318/568.2 |
| 5,999,994 A * | 12/1999 | Wakeland | G06F 13/124 710/240 |
| 2002/0144015 A1* | 10/2002 | Lortz | G05B 19/045 719/318 |
| 2003/0066050 A1* | 4/2003 | Wang | G05B 19/045 717/105 |
| 2003/0097649 A1* | 5/2003 | Jones | G05B 19/042 717/115 |

(Continued)

FOREIGN PATENT DOCUMENTS

CN 1733434 A 2/2006
DE 43 28 897 C1 4/1995
(Continued)

OTHER PUBLICATIONS

European Patent Office; Opposition in European Patent Application No. 2 324 965 dated Oct. 21, 2013; 9 pages.
(Continued)

Primary Examiner — Harry Y Oh
(74) Attorney, Agent, or Firm — Wood Herron & Evans LLP

(57) ABSTRACT

According to a method according to the invention for controlling at least one manipulator, in particular a robot, a plurality of control commands (P, B, F) are worked through, in that in a state machine (ZM) the respective command runs through an active state (-A), wherein in a state machine at least one control command runs through a preliminary state (-E) that is placed ahead of its active state and/or a post-operational state (-P) that is placed after its active state, and/or a plurality of control commands are processed at the same time.

14 Claims, 1 Drawing Sheet

(56) References Cited

U.S. PATENT DOCUMENTS

| | | | | |
|---|---|---|---|---|
| 2004/0059443 | A1* | 3/2004 | Sharangpani | G05B 19/0426 700/48 |
| 2004/0083011 | A1* | 4/2004 | Ganz | G05B 19/045 700/19 |
| 2004/0186623 | A1* | 9/2004 | Dooley | G05D 1/0044 700/245 |
| 2004/0255303 | A1* | 12/2004 | Hogan | G05B 19/045 719/318 |
| 2005/0010331 | A1* | 1/2005 | Taylor et al. | 700/245 |
| 2005/0055695 | A1* | 3/2005 | Law | G05B 19/045 718/100 |
| 2005/0235254 | A1* | 10/2005 | Audfray | G05B 19/045 717/105 |
| 2006/0015709 | A1* | 1/2006 | Bragagnini | G05B 19/045 712/245 |
| 2006/0033462 | A1* | 2/2006 | Moridaira | 318/568.12 |
| 2006/0095692 | A1* | 5/2006 | Chalopin | G05B 19/045 711/154 |
| 2006/0184273 | A1* | 8/2006 | Sawada et al. | 700/245 |
| 2006/0276934 | A1* | 12/2006 | Nihei | B25J 9/1656 700/245 |
| 2007/0282480 | A1* | 12/2007 | Pannese et al. | 700/213 |
| 2008/0208372 | A1* | 8/2008 | Pannese | G05B 13/027 700/48 |
| 2009/0112350 | A1* | 4/2009 | Yuan et al. | 700/117 |
| 2009/0216513 | A1* | 8/2009 | Pidan | G06F 17/504 703/14 |
| 2010/0071057 | A1* | 3/2010 | Plache | G05B 19/045 726/17 |
| 2010/0168911 | A1* | 7/2010 | Jung et al. | 700/245 |
| 2011/0071679 | A1* | 3/2011 | Barajas | B25J 9/1674 700/259 |

FOREIGN PATENT DOCUMENTS

| | | |
|---|---|---|
| DE | 100 40 467 A1 | 2/2002 |
| DE | 103 60 200 A1 | 7/2005 |
| DE | 10 2006 021 300 A1 | 11/2007 |
| EP | 0530401 A1 | 3/1993 |
| EP | 1 398 680 A2 | 3/2004 |
| EP | 1 731 273 A2 | 12/2006 |
| WO | 2007/128631 A1 | 11/2007 |

OTHER PUBLICATIONS

Chinese Patent Office; Office Action in Chinese Patent Application No. 201010571179.8 dated Dec. 12, 2013; 6 pages and English-language translation; 6 pages.

* cited by examiner

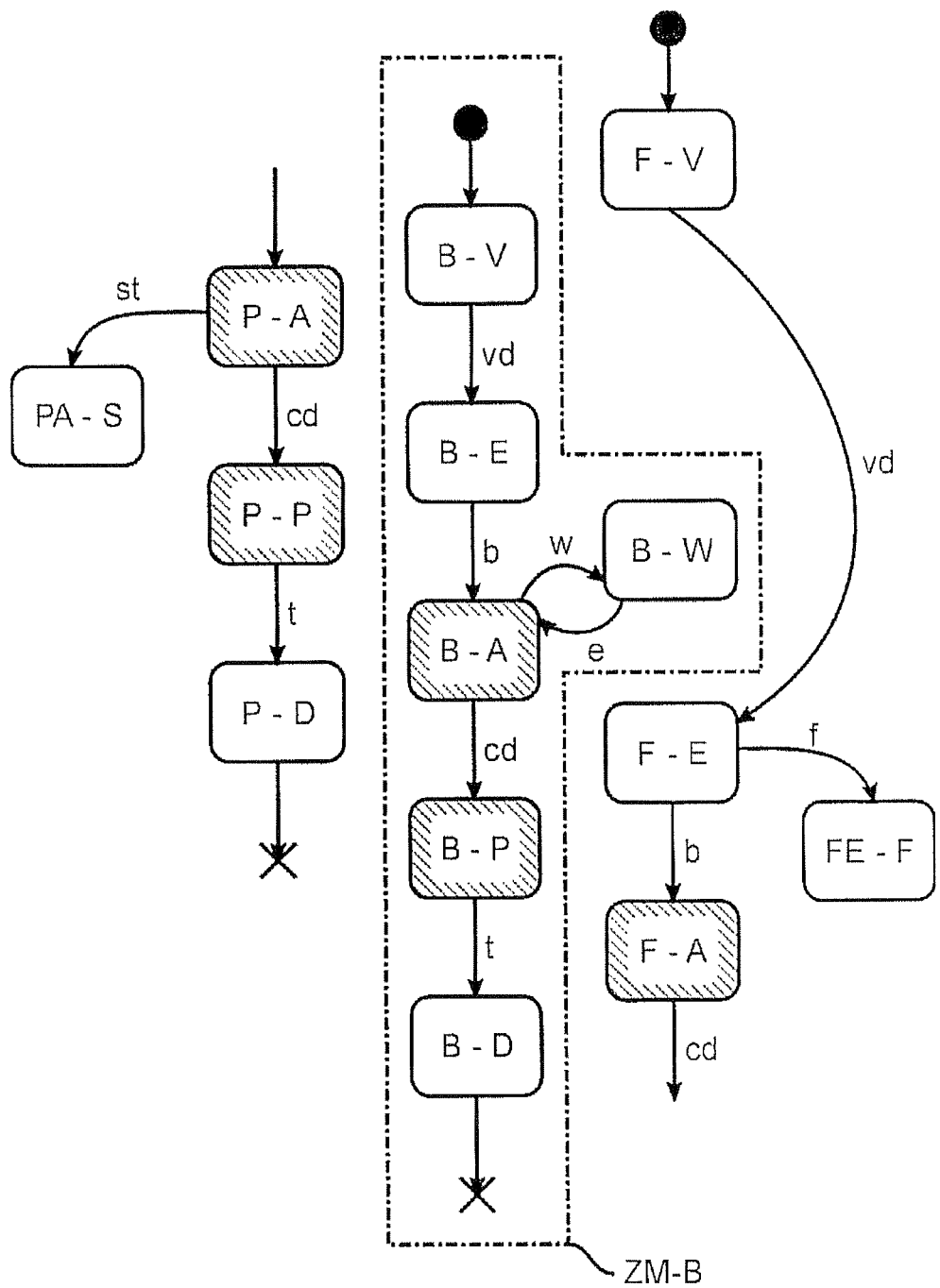

METHOD AND DEVICE FOR CONTROLLING MANIPULATORS

The present invention relates to a method and a device for controlling at least one manipulator, in particular a robot, wherein control commands run through an active state in a state machine.

Control systems for manipulators, in particular for robots such as industrial robots, may be designed or implemented as state machines or automatic state machines. The behavior of the control system, in particular actions of the manipulator or manipulator controlled by it, is determined by states of the state machine, changeovers or transitions between these states and actions in these states. For example, the commercial software "Stateflow" makes it possible to create and simulate control state machines using the de-facto industry standard MatLab-Simulink.

Classic control state machines run through individual states in a determined sequence, in each of which control commands are executed. The subsequent control command is not triggered until a stationary precision has been reached, which makes it difficult for example to blend between position-controlled and force-controlled sections.

Past practice involves additional disadvantages: for example, linking control commands via stationary precise stops results in cycle time losses. On the other hand, filters, observers and the like regularly need a certain lead time in order to build up to full operation, i.e., to generate usable output values. Moreover, it is difficult to link external processes or to modify the control system, due to the determinacy which underlies the inflexible implementation.

A finite state machine is known from EP 1 398 680 B1, which runs through a plurality of states in a determined sequence in order to present smooth intended paths in a robot control system.

The object of the present invention is to improve the controlling of manipulators, and in particular to at least partially eliminate one or more of the disadvantages explained above.

According to the invention, one or more manipulators, in particular (industrial) robots, are controlled by a plurality of control commands, each running through an active state in a state machine. To make the illustration more compact, as a generalization closed-loop control, i.e., the determination of control variables with direct and/or indirect feedback of actual detected values, is also called controlling.

A control command in this case may generally include in particular one or more motion and/or action instructions for one or more manipulators. For example, a control command may include moving to or holding a desired pose, traversing a desired path, or applying a desired force and/or a tool action, such as opening or closing a gripper. To make the illustration more compact, as a generalization an anti-parallel force pair, i.e., a torque, is also called a force in the present case. A control command may also include one or more instructions for one or more process devices, for example for a glue gun or welding tongs, in particular if its controller is integrated into a manipulator controller.

According to a first aspect of the present invention, one or more control commands run through a preliminary state in advance of their active state, and/or through a post-operational state following their active state.

A preliminary or build-up state of a control command, in which preferably control components that are necessary for carrying out the control command are already integrated at least partially into the monitoring and/or data flow of the controller, in particular receiving data in particular from sensors via corresponding interfaces, advantageously makes it possible that filters, observers, parameter identifications and the like are at least partially synchronized with the current, real situation in advance by the data, so that the corresponding functionality is available when the control command transitions into the active state, i.e., is executed, where in the active state commands are issued to actuators, for example manipulator drives, regulators or the like, while in the preliminary state no commands are issued to actuators.

Hence control components or functionalities which are monitored by the control command in its active state are already, in its preliminary state, building up or being synchronized parallel to other, active control commands.

A control component here may include hardware and/or software components, for example computing devices, microcontrollers, memory units, data connections, input/output devices, sensors, actuators, in particular drives, programs, program modules and the like, in order to implement one or more controlling functionalities, for example the detection and conversion of sensor values, specifying of parameters, determining and outputting setting or control values and the like.

A post-operational or maintenance state of a control command, in which the manipulator or manipulators, after processing the control command in the active state, are controlled preferably in a prescribed manner, in particular a state of the manipulator or manipulators is held after the control command has been processed, makes an orderly transfer to another active control command possible, since in this way a well-defined state is always maintained, even after processing of the control command.

Thus a post-operational state can correspond to the active state that precedes it; in particular, commands may also be issued to actuators in the post-operational state. In a preferred embodiment, the control command may be modified here, in particular re-parameterized, between the active and the post-operational state. Thus for example, a control command that includes a desired pose of a manipulator may move to this desired pose in an active state with rigid, i.e., precise position regulation, and then stop, for example by reducing an integral portion or lessening control coefficients of a PID regulator, i.e., re-parameterizing the controlling functionality, until another control commands takes over the controlling.

According to a second aspect of the present invention, which is preferably implemented together with the first aspect, a plurality of control commands are processed at the same time, preferably essentially parallel to and/or independently of each other. In particular, one or more control commands may already be in a preliminary state, in order to synchronize filters, observers, parameter identifications and the like while another control command is still active. The latter can then transition to a post-operational state after processing, and hold the manipulator or manipulators in an orderly state there, until another control command takes over the controlling. Nevertheless, both aspects may also be implemented independently of each other. Thus the transition of an automatic state machine into a post-operational state may ensure for example that a well-defined state always exists, even if a program stop or emergency stop for example is triggered between two sensor-based control commands. On the other hand, a plurality of simultaneously processed control commands may also by synchronized through appropriate transfers or transitions between the active states. Preferably, however, the first and second aspect are combined with each other.

A basic idea of the present invention is thus that control commands each run through a command state machine, where an active state in which a control command is executed is preceded and followed by a preliminary and a post-operational state, and several control commands are able to run through different states at the same time.

According to a preferred embodiment, a control command in a state machine runs through a pre-processing state that is again placed ahead of its preliminary state. Contrary to the preliminary state, preferably no tie-in to the data flow takes place here yet, in order to update control functionalities such as filters, observers, parameter identifications and the like.

Instead, in a pre-processing state for example resources may be provided for processing the control command and interfaces may be specified; in particular, interfaces may be negotiated or coordinated. Preferably, in a pre-processing state control functionalities and/or components, for example interpolators, force regulators, trackers and the like, are informed of the control command and possibly are parameterized accordingly. For example, in a pre-processing state of a control command for position-regulated traversing of a desired path an interpolator may be informed and a position regulator set. Advantageously, such a pre-processing state may be non-time-critical, and thus may preferably be run through outside of a control cycle.

In addition or alternatively, in a state machine a control command may run through a completed state that is again positioned after its post-operational state.

A control command can take over the monitoring of control components or functionalities as soon as it changes to an active state. As soon as all control components or functions monitored by a first control command in an active or post-operational state have been taken over by other control commands, for example drive regulators are now activated by a different control command, the first control command can transition to the completed state. In this state the first control command may be deleted within the controller, or may transition to a waiting, pre-processing or preliminary state to be used again.

In addition or alternatively to the states explained above, the pre-processing, preliminary, active, post-operational and completed state, one or more additional states may be provided in a state machine for a control command.

For example, the control command may transition to a safety state through an emergency stop or some other action triggered by a safety device. In this safety state for example a path-true stop or the behavior of a force regulating system may be checked after an emergency stop. In contrast to traditional control state machines, such control-command-specific safety states advantageously make specific responses possible. For example, the controller is able to carry out various actions if an emergency stop occurs in an active state of a control command which is traversing a planned path under position control, or if this occurs in an active state of a control command that is executing a force regulation under sensor guidance.

In addition or alternatively, error and/or waiting states, again preferably control-command-specific, may also be provided.

As explained above, a control command in a state may access at least one control component, in particular a sensor and/or actuator functionality; for example, in a preliminary state it may already access sensor functionalities in order to allow filters, observers and the like to build up, and in an active state it may also access actuator functionalities in order to control the manipulator or manipulators. At the same time, advantageously the possibility also results of synchronously starting several control components or functionalities monitored by one control command, i.e., when transitioning to the active state.

As explained, command-specific and/or state-specific control functions may also be assigned to a control command. For example, an interpolator or regulator may implement various functionalities depending on the control command by which it is being monitored, and may for example generate different output values for a control command for position-regulated path traversing than for a command to regulate forces.

Preferably, a control component or functionality signals to a control command its readiness to be taken over, activated and/or ended by the command. For example, a component in the preliminary state may signal readiness that it has reached a stationary or built-up state and hence is ready for the active state. Likewise, the component in the maintenance state may signal readiness to be taken over by a different control command.

Advantageously, severe real-time requirements of a process controller may be uncoupled from a motion controller by means of a control system according to the invention. In particular, the time between two control commands may be of random length. In addition, the control system according to the invention advantageously makes it possible to adapt planned control commands to current conditions offline in advance and thus non-time-critically, just shortly before their actual execution. Advantageously, a control system according to the invention also in particular enables blending between previously planned and sensor-guided paths.

In particular, if a plurality of commands are processed simultaneously, in a preferred embodiment a sequential order may be specified in which these run through an active state.

This may for example be determined dynamically by the point in time at which the control commands have each concluded a particular state, in particular a preliminary or build-up state. Preferably, with such a FIFO ("first-in first-out") sequence, a resource idle time may be reduced, since a command always runs through an active state and in so doing uses resources, as soon as at least one control command is ready to do so. If several control commands are ready to transition to the active state at the same time, their sequential order may be specified by a defined selection criterion, for example, priority processing of control commands which save resources, which use more resources, or which have higher priority.

The sequential order may likewise by specified dynamically, for example when creating the control commands. To this end, control commands may for example be assigned dependencies or relationships to other control commands and/or conditions, so that a dependent control command does not run through an active state until a control command on which it is dependent according to a defined relationship has run through a particular state, in particular an active or maintenance state, or until a particular condition such as the presence of a sensor signal or the like has been met.

The sequence may also be specified statically or semi-dynamically, for example by assigning ordinal numbers to the control commands during programming for the order in which they will run through the active state, independently of whether a different control command with a higher ordinal number is ready to do so even earlier. This may be done semi-dynamically, insofar as the specified sequence is changeable, for example in order to allow for newly added or removed control commands. This has the advantage of a deterministic order of execution, which is adhered to independently of the time at which the various control commands run through the individual states.

In addition or alternatively, the order in which one or more resources are available to competing control commands may also be defined. For example, it may be specified that an active control command or a command with a lower ordinal number always has priority access to the resource, and that control commands with higher ordinal numbers or in other states, for example a build-up state, may only access the resource if it is not being used at the moment by a higher-priority control command. FIFO processing for example is also possible here. In this way, the resources that enable access by a plurality of competing control commands in the predefined sequential order may be utilized optimally, since it is not necessary to wait until a control command that is using a resource has been processed completely. In particular, parallel program tasks may send control commands that wish to use the same resource(s) to a controller.

Additional advantages and features result from the subordinate claims and the exemplary embodiments. To this end the sole FIGURE shows the following, partially in schematic form:

FIG. 1: part of a control system according to an embodiment of the present invention.

FIG. 1 shows states "-V" (pre-processing state), "-E" (build-up state), "-A" (active state), "-P" (maintenance state), and "-D" (completed state, "done") of control commands "P", "B", and "F". Here "P" symbolizes a control command for position-regulated movement to a desired pose of an industrial robot (not shown), "F" a control command for force regulation, in which the robot brings a defined force to bear with its tool, and "B" a control command for holding a current pose while compensating for weight, friction and other forces by means of a model-based regulating system whose model is adapted by an observer.

Every control command runs through a state machine. As an example, dash-dotted lines in FIG. 1 indicate the state machine ZM-B, which is running through the control command B to hold a current pose by means of a model-based regulating system with observer.

Beginning from the starting state, symbolized in the usual way by a solid circle, command B first runs through a pre-processing state B-V in which the control command is pre-processed. In this state parameters are evaluated and resources readied. For example, the control functionalities "model" and "observer" are informed of the impending order, their parameters are set to default values, and interfaces between them are negotiated. This pre-processing is non-time-critical, and may take place in parallel or overlapping with other states P-A, F-V, as shown in FIG. 1, in which a time sequence may be thought of, vertically from top to bottom.

If the pre-processing is included (FIG. 1: "vd"), control command B transitions to a preliminary or build-up state B-E. In this state, all involved components are already linked into the monitoring and data flow and are able to receive and send data cyclically via their interface. For example, the observer receives actual joint positions from drive sensors and drive settings from the control system, estimates model parameters therefrom and sends these to the model. In this way, observer and model build up to the actual robot. In this state, control command B is not yet allowed to send any control commands to actuators of the robot.

Parallel to this, the robot has moved under position regulation to a desired pose. To this end, a corresponding control command P has run through an active state P-A, in which the pose is moved to, and has then transitioned to a maintenance state P-P which will be explained further below in reference to the control command B (FIG. 1: "cd"), in which the pose is held under position regulation, the parameters of the position regulator being adjusted in this maintenance stat to the maintenance state, in order to set the regulator to "soft". In this maintenance state P-P, the control components monitored by the command P, for example drive regulators, signal that they are ready to be taken over by a new control command.

As soon as all of the components of control command B have also signaled their readiness to end the build-up state, for example model and observer have reached a quasi-stationary or built-up state, control command B transitions to the active state B-A (FIG. 1: "b"). This differs from the preceding build-up state B-E only in that writing access may now also be made to hardware resources, i.e., control commands for example may now be sent to drives or drive regulators.

If control command B has been worked through (FIG. 1: "cd"), it transitions to a maintenance state B-P. In this state, the state reached by the robot, for example its pose, is held. As explained above in reference to the maintenance state P-P of position regulating command P, this does not differ from the active state with regard to the monitoring and data flow, but the parameterizing can be adapted to the needs of the state being maintained; for example, a pilot reinforcement of the model-based regulating may be reduced.

In the maintenance state the involved control components, for example the drive regulators, signal their readiness to now be taken over by other control commands. As soon as the command F for regulating the force of the robot, which, as depicted in FIG. 1, is running through an automatic state machine, by analogy to the previously explained command B, has ended its build-up state F-E, has transitioned to the active state F-A and in so doing has taken over the monitoring of the hardware resources used, in particular has taken over the drives of the robot, the execution of control command B is ended; it transitions to a completed state B-D (FIG. 1: "t"), in which it is deleted for example within the control system.

In FIG. 1, the states which the robot controller runs through sequentially (from top to bottom in FIG. 1) are identified with hatching. Problem-free blending between the move to the pre-planned pose by the control command P-A and the sensor-guided force regulation by the control command F-A can be recognized. In addition, it is evident that the commands P, B and F run through their state machine simultaneously, partially in parallel, and independently of each other. It can be seen that additional control commands may be implemented in a simple manner by implementing a corresponding state machine. In this respect, according to the invention each command runs through its own state machine (example: ZM-B), while the control system as a whole likewise runs through a state machine (indicated by hatching in FIG. 1).

At the same time, the order in which the control commands P, B and F run through the active state is defined, for example by assigning them ascending ordinal numbers or dependencies on other control commands. In the exemplary embodiment, for example, by assigning the ordinal number "1" to command P and the ordinal number "2" to the command to hold a current pose, the user has specified by means of model-based regulation that control command P will run through the active state first and that control command B will not do so until afterward. Furthermore, by specifying a dependency on B for control command F he has specified that control command F for force regulation must not run through its active state until control command B has already run through it and has transitioned to its maintenance state B-P. It can be seen on the basis of the time sequence indicated by hatching that the order P→B→F thus specified is maintained even if control command F has ended its build-up phase earlier than control command B.

It can also be seen that resources can be used optimally here, since competing control commands are executed at the same time. If for example both control command P and control command B each want to access position sensors, these may be made available to the control commands in alternating order, corresponding to the sequence specified— for example by the ordinal numbers. It is likewise also possible that the order in which resources are made available to various competing commands is determined for example by their state, for example always first to an active control command, and only then, when the latter does not need the resource, to a control command in the build-up state.

Purely by way of example, additional control command states are sketched in FIG. 1; for greater clarity in the segment of an automatic state machine in FIG. 1 not all of the provided states or transitions are depicted.

For example, at an event "w" active command B transitions to a waiting state B-W, from which it returns to the active state B-A at an event "e." Such events may be for example user inputs, sensor signals, program flow marks or the like.

For the position-regulated movement to the desired pose by the active control command P, a specific emergency stop state PA-S is provided for this control command, to which the controller transitions in the event of an emergency stop input "st." In this case for example a path-true stop is executed. If the emergency stop input "st" occurs when control command P is in the maintenance state or when some other control command B, F is in the active or maintenance state, a transition can be made to other safety states; for example, a desired contact force can be set to zero (not shown).

Finally, purely by way of example, an error state FE-F is depicted, if an error occurs in its build-up state F-E, in which for example filters for force sensors are building up (FIG. 1: "f"). It is possible here for example to recalibrate force sensors and/or to re-initialize filters.

REFERENCE LABELS

B control command "Hold pose using model-based regulation with observer"
F control command "Impose a desired force using force regulation"
P control command "Travel to desired pose under position regulation"
-A active state
-D completed state
-E build-up state
-P maintenance state
-V pre-processing state
-F (command-specific) error state
-S (command-specific) safety state
-W (command-specific) waiting state

The invention claimed is:

1. A method for controlling a robotic manipulator, comprising:
    working through a plurality of control commands using a processor to generate a particular motion or action of the robotic manipulator,
    wherein each control command includes issuance of at least one particular motion or action instruction for the robotic manipulator, wherein each control command runs through at least an active state in a state machine,
    wherein at least one of the plurality of control commands runs through at least one of a preliminary state associated with receiving sensor data from the robotic manipulator without motion or action thereof and placed before the active state, or a post-operational state associated with termination of the motion or action of the active state and placed after the active state in the state machine,
    wherein a first and a second of the plurality of control commands are processed by the processor at the same time,
    wherein the at least one control command runs through at least one of a pre-processing state placed before the preliminary state or a completed state placed after the post-operational state in the state machine, and
    wherein the first control command transitions to a completed state after all control components monitored by the first control command in the active state or the post-operational state have been taken over by other control commands.

2. The method of claim 1, wherein at least one of the plurality of control commands runs through at least one of a safety state, an error state, or a waiting state in a state machine.

3. The method of claim 1, wherein at least one of the plurality of control commands communicates with at least one control component regarding the functionality of a sensor or an actuator.

4. The method of claim 1, wherein a control-specific or state-specific control system functionality is assigned to one of the plurality of control commands.

5. The method of claim 1, wherein running through a state of one of the plurality of control commands comprises at least one of evaluating parameters, readying resources, specifying interfaces, receiving cyclical data, or sending cyclical data.

6. The method of claim 1, further comprising signaling readiness to a control command from a hardware component of the control system.

7. The method of claim 1, further comprising defining an order of priority for the plurality of control commands such that either the control commands run their active states sequentially in the defined order or the control commands access a shared resource in the defined order.

8. A system for controlling a robotic manipulator, comprising:
    a controller configured to work through a plurality of control commands to generate a particular motion or action of the robotic manipulator,
    wherein each control command includes issuance of at least one particular motion or action instruction for the robotic manipulator, wherein each control command runs through at least an active state in a state machine,
    wherein the controller runs at least one of the plurality of control commands through at least one of a preliminary state associated with receiving sensor data from the robotic manipulator without motion or action thereof before the active state, or a post-operational state associated with termination of the motion or action of the active state after the active state in the state machine,
    wherein the controller runs the at least one control command through at least one of a pre-processing state placed before the preliminary state or a completed state placed after the post-operational state in the state machine, and wherein the controller is configured to process a first and a second of the plurality of control commands at the same time, and wherein the first control command transitions to a completed state after all control components monitored by the first control command in the active state or the post-operational state have been taken over by other control commands.

9. A program product, comprising:

a non-transitory computer-readable medium; and program code stored on the computer-readable medium and configured to control a robotic manipulator;

the program code configured to work through a plurality of control commands to generate a particular motion or action of the robotic manipulator, wherein each control command includes issuance of at least one particular motion or action instruction for the robotic manipulator, wherein each control command runs through at least an active state in a state machine, wherein at least one of the plurality of control commands runs through at least one of a preliminary state associated with receiving sensor data from the robotic manipulator without motion or action thereof and placed before the active state, or a post-operational state associated with termination of the motion or action of the active state and placed after the active state in a state machine, wherein the at least one control command runs through at least one of a pre-processing state placed before the preliminary state or a completed state placed after the post-operational state in the state machine, and wherein a first and a second of the plurality of control commands are processed at the same time, and wherein the first control command transitions to a completed state after all control components monitored by the first control command in the active state or the post-operational state have been taken over by other control commands.

10. The method of claim 1, wherein the at least one of control command runs through the preliminary state, and while the at least one control command is in the preliminary state, the processor receives real-situation data of one or more control components that are necessary for carrying out the at least one control command so that functionality corresponding to the one or more control components is available when the at least one control command transitions to the active state.

11. The method of claim 1, wherein the at least one control command runs through the post-operational state, and while the at least one control command is in the post-operational state, the robotic manipulator is held in a particular state until another of the control commands transitions into the active state.

12. The method of claim 1, wherein the at least one control command runs through the pre-processing state, and while the at least one control command is in the pre-processing state, one or more resources for processing the at least one control command are negotiated.

13. The method of claim 1, wherein the at least one control command runs through the completed state, and while the at least one control command is in the completed state, the at least one control command is deleted or transitioned into a waiting state, the pre-processing state, or the preliminary state.

14. The method of claim 1, wherein a third one of the plurality of control commands is processed by the processor at the same time as the first and the second control commands.

* * * * *